(No Model.) 2 Sheets—Sheet 1.
A. ENGLE & S. C. THOMPSON.
APPARATUS FOR DESTROYING GARBAGE, NIGHTSOIL, &c.
No. 508,511. Patented Nov. 14, 1893.
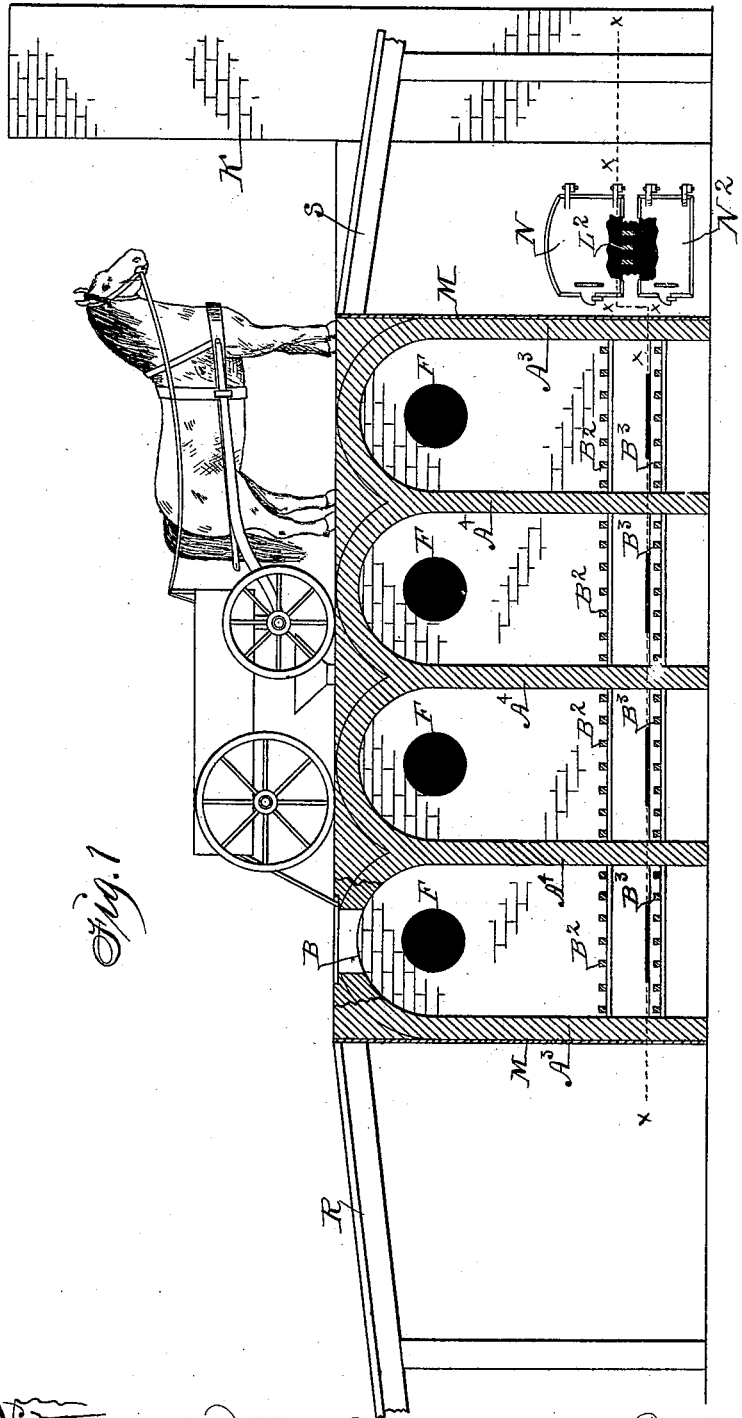

(No Model.) 2 Sheets—Sheet 2.
A. ENGLE & S. C. THOMPSON.
APPARATUS FOR DESTROYING GARBAGE, NIGHTSOIL, &c.
No. 508,511. Patented Nov. 14, 1893.
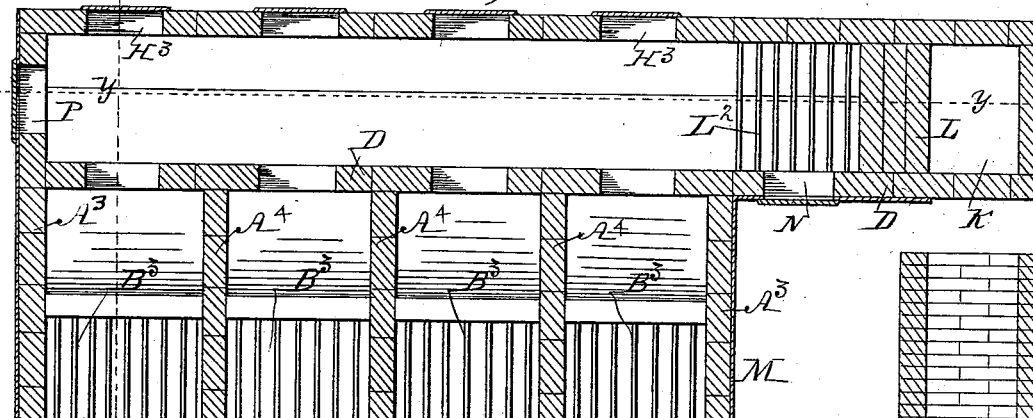
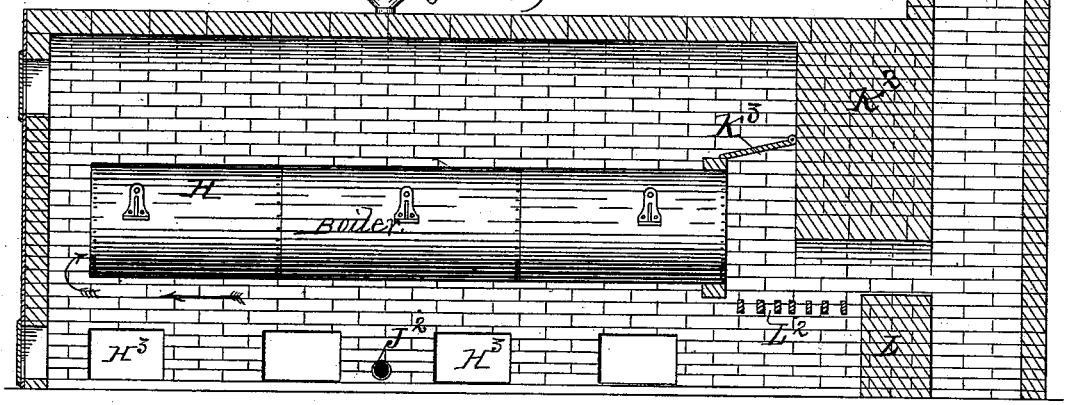
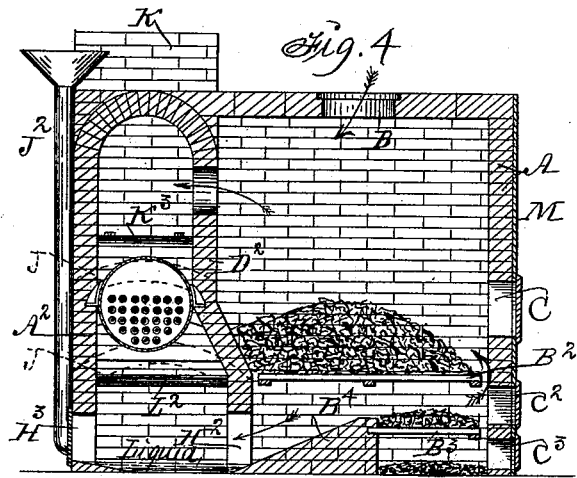

UNITED STATES PATENT OFFICE.

ANDREW ENGLE, OF DES MOINES, IOWA, AND SAMUEL C. THOMPSON, OF BALDWIN, KANSAS; SAID THOMPSON ASSIGNOR TO C. HUTTENLOCHER, OF DES MOINES, IOWA.

APPARATUS FOR DESTROYING GARBAGE, NIGHT-SOIL, &c.

SPECIFICATION forming part of Letters Patent No. 508,511, dated November 14, 1893.

Application filed February 9, 1892. Serial No. 420,926. (No model.)

*To all whom it may concern:*

Be it known that we, ANDREW ENGLE, of Des Moines, in the county of Polk and State of Iowa, and SAMUEL C. THOMPSON, of Baldwin, in the county of Douglas and State of Kansas, have invented a new and useful Apparatus for Destroying Garbage, Night-Soil, &c., of which the following is a specification.

Our object is to facilitate the burning and destruction of garbage and other comparatively dry offensive refuse matter, and also night soil and other wet and offensive substances, without fouling the atmosphere of the locality where our method is practiced.

Our invention consists in an apparatus for simultaneously drying and burning separated deposits of matter.

In the accompanying drawings Figure 1 is a detail longitudinal sectional view of our apparatus showing the wagon platform and portions of inclined approaches at the ends of the platform and furnace. Fig. 2 is a horizontal sectional view through the line $x\,x$ of Fig. 1, clearly showing the relative positions of the separate receptacles and places for separately drying and burning deposits of matter that is to be destroyed. Fig. 3 is a longitudinal sectional view through the line $y\,y$ of Fig. 2. Fig. 4 is a transverse sectional view through the line $z\,z$ of Fig. 2 showing the means for collecting liquid in the bottom of the furnace to be evaporated by heat generated from the matter drained and dried and burned on the grates.

A is the front wall, $A^2$ the parallel rear wall, $A^3$ the end walls and $A^4$ transverse division walls of the main portion of our apparatus that is adapted to receive, retain, drain, dry and burn garbage and wet and offensive matter that is to be destroyed. The walls $A^4$ extend from the front wall A to another wall that is parallel with the wall $A^2$ as hereinafter described. Each compartment produced by means of the walls $A^4$ has an arched roof and an opening in the roof that is provided with a removable cover B. A grate $B^2$ in the lower portion of each compartment terminates at some distance from the front wall A and is adapted to receive and support garbage and other solid refuse matter.

$B^3$ is a grate in each compartment in a plane below the grate $B^2$ and extends rearward from the front wall A to the top portion of a rearwardly inclined bottom $B^4$, as shown in Fig. 4, in such a manner that matter drained and dried and charred on the grate $B^2$, can be scraped forward therefrom to drop upon the grate $B^3$ and burned thereon. Each compartment has a door C above the grate $B^2$, a door $C^2$ between the grates $B^2$ and $B^3$, and a door $C^3$ below the grate $B^3$.

D is a wall parallel with and at some distance from the rear wall $A^2$. An arched roof $D^3$ connects them at their tops as required to produce a continuous chamber in rear of the compartment in front of the wall $A^2$, and openings F in the wall D allow direct communication between each chamber in front of the wall D and the chamber in rear thereof.

H is a boiler fitted and fixed between the bottom portions of the walls $A^2$ and D. The wall D has openings $H^2$ at its bottom that allow liquid matter drained from garbage on the grates $B^2$ and upon the inclined bottom $B^4$ to enter the chamber under the boiler H and to be evaporated by the products of combustion generated on the grates $B^2$ and $B^3$ as hereinafter specified.

$H^3$ are doors in the bottom portion of the rear wall $A^2$ through which access is gained to the chamber and liquid receptacle between the parallel walls $A^2$ and D, required to receive sediment that may accumulate therein.

$J^2$ is a tube provided with a funnel shaped open top through which liquid matter may be conveyed direct from the wagon platform on top of the apparatus to the chamber at the bottom adapted to receive and evaporate liquids.

K is a chimney at the end of the parallel walls D and $A^2$.

$K^2$ is an arched wall, between the two walls D and $A^2$, that produces an elbow-shaped passage way between the continuous chamber at the top portion of the parallel walls D and A² and the chimney, as shown in Fig. 3.

K³ is a damper adapted for closing the elbow-shaped passageway as required to close communication between the said continuous chamber and the chimney K.

L is a wall between the bottom portion of the walls D and A² and under the arched wall K², and L² is a grate that extends between the said two walls in a plane near the top of the wall L in such a manner that a fire can be maintained thereon to consume all the offensive odors and gases that may escape from the liquids and solids subjected to the action of the fires upon the grates B² and B³ in the compartments between the parallel walls A and A².

M represents a sheet metal wall facing.

N is a door through which access is gained to the grate L² as required to start and maintain a fire thereupon, and N² is a door to the chamber under the grate L².

P is the door at the end of the continuous liquid chamber.

R and S represent inclined approaches at the ends of the apparatus adapted for driving over as required to carry garbage and other matter in wagons to the platform on top of the series of compartments and to dump it into the compartments direct from the wagon into the compartments and upon the grates L² therein.

It is obvious that compartments at one end may be used while compartments at the other end are empty and undergoing repairs.

In the practical operation of our method and apparatus we dump garbage and other solid matter upon the grates B² and start fires on the grates B³ and open the damper K³ so as to allow the products of combustion to pass upward and to envelop the matter on the grates B² in their passage way through the opening F in the wall D and the continuous chamber in rear thereof and from thence over a fire on the grate L² to the chimney K. Any number of compartments may be thus simultaneously utilized for drying matter on the grates B². But as it is not practical to fill each compartment at the same time those first filled may have the matter on their grates B² dried and charred while others are being filled. So the matter thus dried and charred in the compartments can be raked forward on the grates B² and allowed to fall on the grates B³ to be burned and utilized for generating heat to dry and prepare additional matter dumped on the grates B². The operation can thus be continuous in drying, charring, burning and destroying garbage and other offensive refuse matter without allowing any offensive odor or gas to escape through the chimney to vitiate the atmosphere outside of the apparatus.

To evaporate the liquid in the continuous chamber at the rear of the inclined bottom B⁴ it is only necessary to close the damper K³ so that the products of combustion will pass from the grates B² and B³ into the continuous chamber and over the fire upon the grate L² to the chimney. Offensive odors and gases generated by the evaporation of liquid will also thus be prevented, by the fire on the grate L², from escaping through the chimney and the products of combustion that come in contact with the boiler will be utilized for heating water and generating steam.

We claim as our invention—

1. An apparatus for destroying garbage, night soil and other offensive solids and liquids, comprising a series of contiguous chambers having covered tops and openings through their tops, a grate in the lower portion of each of said chambers extending from the rear wall to near the front wall, a grate in a lower plane in each chamber extending from the front wall rearwardly, an inclined bottom extended from said lower grates downward to the rear wall, a continuous chamber for liquids extended along the lower rear edge of said inclined bottom, a second chamber extending over the said chamber for retaining liquids and having communication with each one of the chambers having grates, a chimney at some distance from the ends of the two chambers in rear of the chambers having grates, a passage-way leading from the said two chambers in rear of the grates to the chimney, a damper for closing the passage from the upper end of the said chambers to direct the products of combustion from the grates through the lower chamber to evaporate liquid therein, a grate in the passage way between the chamber containing the liquid and the chimney, means for conveying and depositing matter into the series of contiguous chambers and upon the grates therein, and doors in the walls for gaining access to the different chambers, all arranged and combined to operate in the manner set forth for the purposes stated.

2. An apparatus for destroying garbage &c., and generating steam, comprising a series of contiguous parallel compartments adapted for retaining and draining and drying wet and offensive matter on grates therein, grates in same compartments in a lower plane for burning the dried matter, a chamber in the rear of said compartments and in a lower plane to receive the liquid drained from the matter on the upper grates in the said compartments, a boiler in a plane above the said chamber for liquid matter, a chamber in a plane above the boiler having communication with the top portion of each of said parallel contiguous compartments, a chimney, and a grate and combustion chamber between the chimney and the end of the boiler and the chambers above and below the boiler, and a damper for closing the passage way between the chamber above the boiler and the combustion chamber and grate to direct the products of combustion from the series of parallel compartments under the boiler and over the liquid in the chamber under the boiler, all arranged and combined to operate in the manner set forth.

ANDREW ENGLE.
SAMUEL C. THOMPSON.

Witnesses as to the signature of Andrew Engle:
J. RALPH ORWIG,
THOMAS G. ORWIG.

Witnesses as to the signature of Samuel C. Thompson:
F. A. COLWELL,
GEO. J. MCCLURE.